(12) United States Patent
Yi

(10) Patent No.: US 10,103,805 B2
(45) Date of Patent: Oct. 16, 2018

(54) METHOD AND APPARATUS FOR REQUESTING TRANSMISSION OF SYNCHRONIZATION SIGNALS IN WIRELESS COMMUNICATION SYSTEM

(71) Applicant: LG ELECTRONICS INC., Seoul (KR)

(72) Inventor: Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/512,436

(22) PCT Filed: Sep. 21, 2015

(86) PCT No.: PCT/KR2015/009890
§ 371 (c)(1),
(2) Date: Mar. 17, 2017

(87) PCT Pub. No.: WO2016/043569
PCT Pub. Date: Mar. 24, 2016

(65) Prior Publication Data
US 2017/0279522 A1    Sep. 28, 2017

Related U.S. Application Data

(60) Provisional application No. 62/053,212, filed on Sep. 21, 2014.

(51) Int. Cl.
*H04W 4/00* (2018.01)
*H04B 7/216* (2006.01)
*H04W 74/08* (2009.01)
*H04W 56/00* (2009.01)
*H04B 7/26* (2006.01)
*H04L 29/06* (2006.01)

(52) U.S. Cl.
CPC ............... *H04B 7/216* (2013.01); *H04B 7/26* (2013.01); *H04B 7/2675* (2013.01); *H04L 29/06047* (2013.01); *H04W 56/0015* (2013.01); *H04W 74/0833* (2013.01)

(58) Field of Classification Search
None
See application file for complete search history.

(56) References Cited

U.S. PATENT DOCUMENTS

| 2012/0165058 A1* | 6/2012 | Hwang | H04W 74/006 455/509 |
| 2012/0224568 A1* | 9/2012 | Freda | H04W 56/0015 370/338 |
| 2012/0307774 A1* | 12/2012 | Zhao | H04W 74/08 370/329 |

(Continued)

FOREIGN PATENT DOCUMENTS

| WO | 2013/115571 A1 | 8/2013 |
| WO | 2014/110805 A1 | 7/2014 |

*Primary Examiner* — Otis L Thompson, Jr.
(74) *Attorney, Agent, or Firm* — Dentons US LLP

(57) ABSTRACT

A method and apparatus for requesting a synchronization signal in a wireless communication system is provided. A machine type communication user equipment (MTC UE) transmits a random access preamble for requesting the synchronization signal to a network, receives the synchronization signal from the network, and performs synchronization by using the received synchronization signal.

12 Claims, 6 Drawing Sheets

(56) References Cited

U.S. PATENT DOCUMENTS

| | | | |
|---|---|---|---|
| 2012/0327895 A1* | 12/2012 | Wallen | H04W 48/12 370/330 |
| 2013/0034059 A1 | 2/2013 | Lee et al. | |
| 2013/0053075 A1* | 2/2013 | Yoshizawa | H04W 74/085 455/500 |
| 2013/0155894 A1* | 6/2013 | Li | H04W 74/0833 370/252 |
| 2013/0182680 A1* | 7/2013 | Choi | H04W 28/20 370/331 |
| 2013/0201957 A1* | 8/2013 | Van Phan | H04W 4/005 370/329 |
| 2013/0215861 A1* | 8/2013 | Nam | H04W 74/0833 370/329 |
| 2013/0272148 A1* | 10/2013 | Fong | H04W 28/02 370/252 |
| 2013/0315152 A1* | 11/2013 | Ratasuk | H04W 76/023 370/329 |
| 2013/0329654 A1* | 12/2013 | Zakrzewski | H04W 4/005 370/329 |
| 2014/0071930 A1 | 3/2014 | Lee et al. | |
| 2014/0133430 A1* | 5/2014 | Yang | H04L 1/1854 370/329 |
| 2014/0307621 A1* | 10/2014 | Frenger | H04W 4/70 370/328 |
| 2014/0314048 A1* | 10/2014 | Yi | H04W 48/12 370/332 |
| 2014/0376509 A1* | 12/2014 | Young | H04L 5/0037 370/330 |
| 2015/0024744 A1* | 1/2015 | Yi | H04W 48/16 455/434 |
| 2015/0146631 A1* | 5/2015 | Kim | H04W 74/0833 370/329 |
| 2016/0345118 A1* | 11/2016 | Oh | H04W 4/005 |
| 2017/0134881 A1* | 5/2017 | Oh | H04W 4/005 |
| 2017/0164137 A1* | 6/2017 | Duval | H04W 4/005 |

* cited by examiner

[Fig. 1]
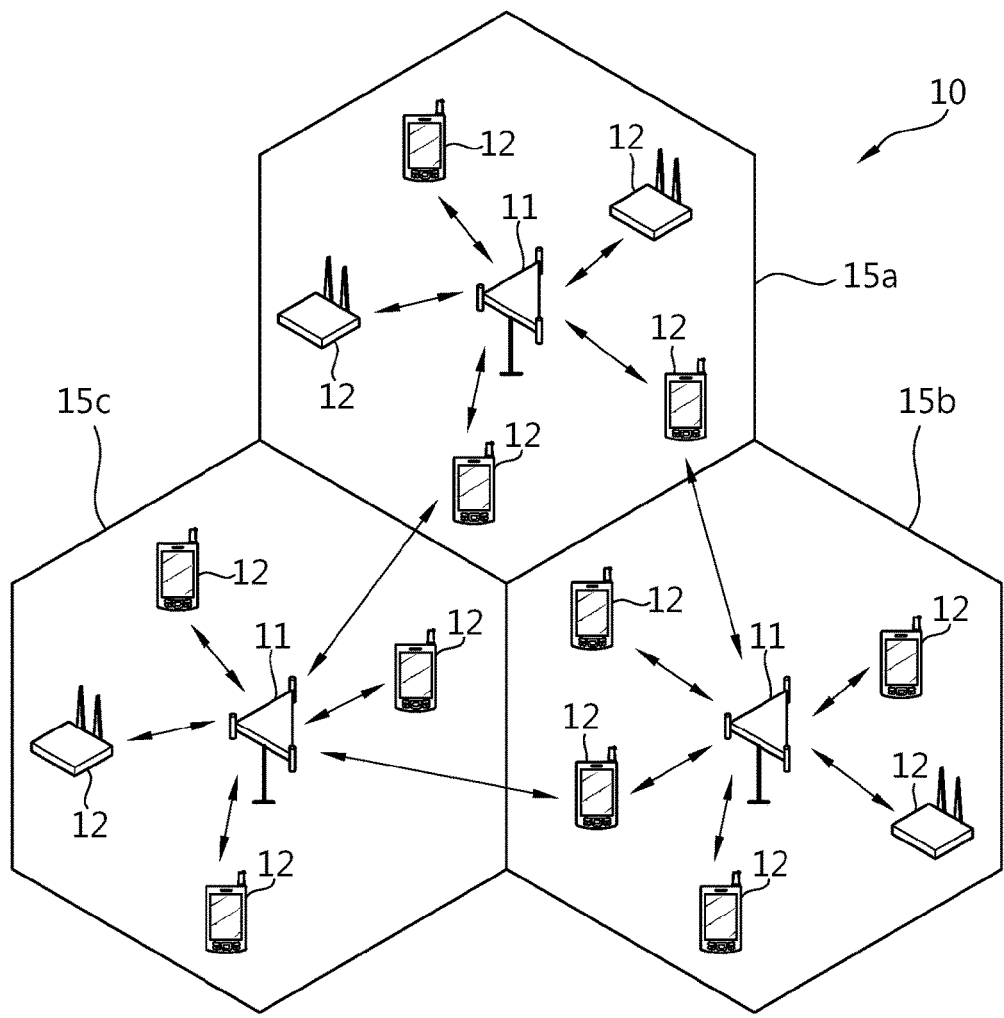
[Fig. 2]
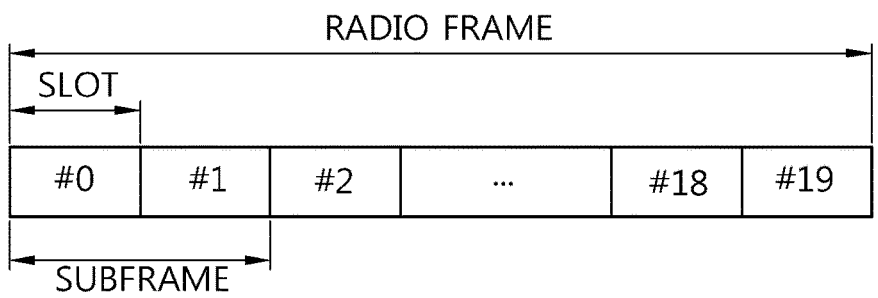

[Fig. 3]
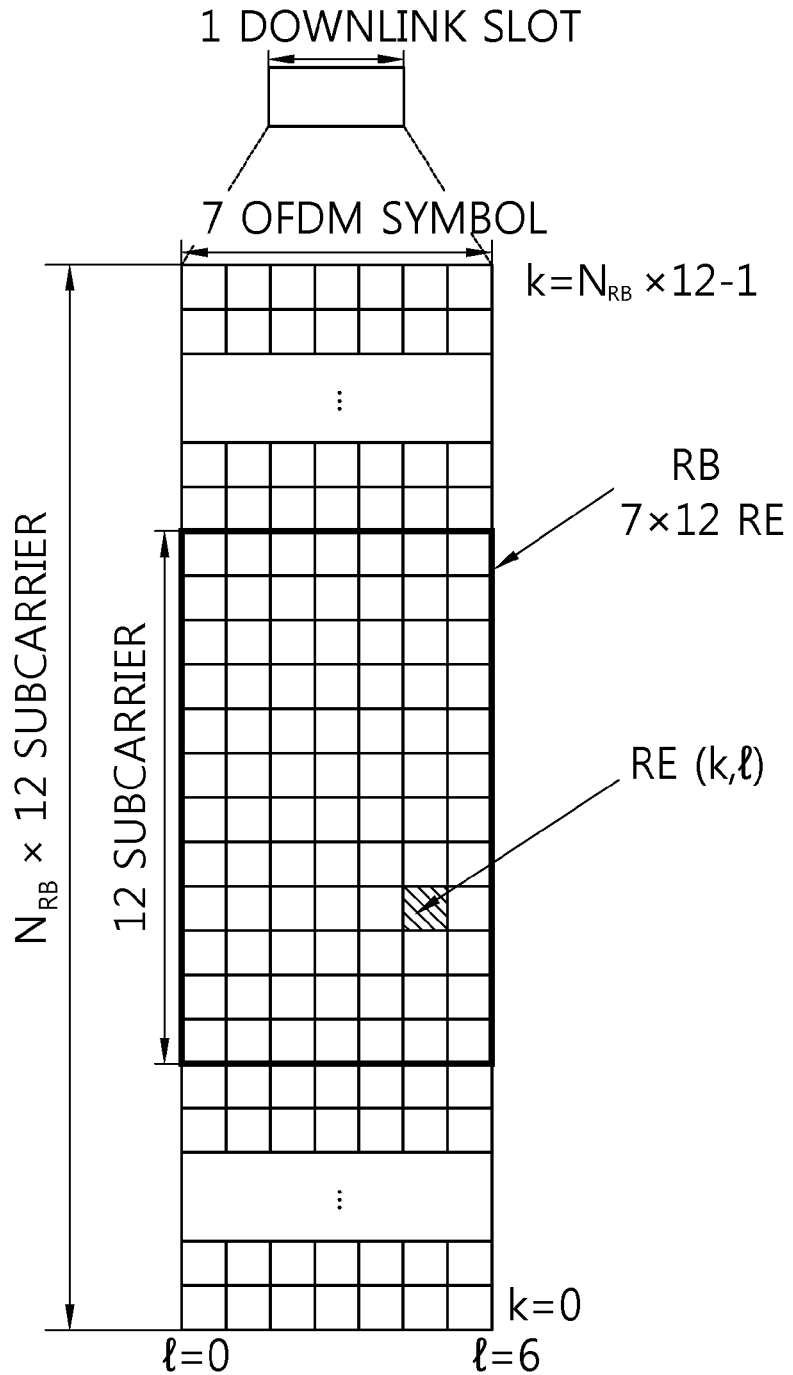

[Fig. 4]
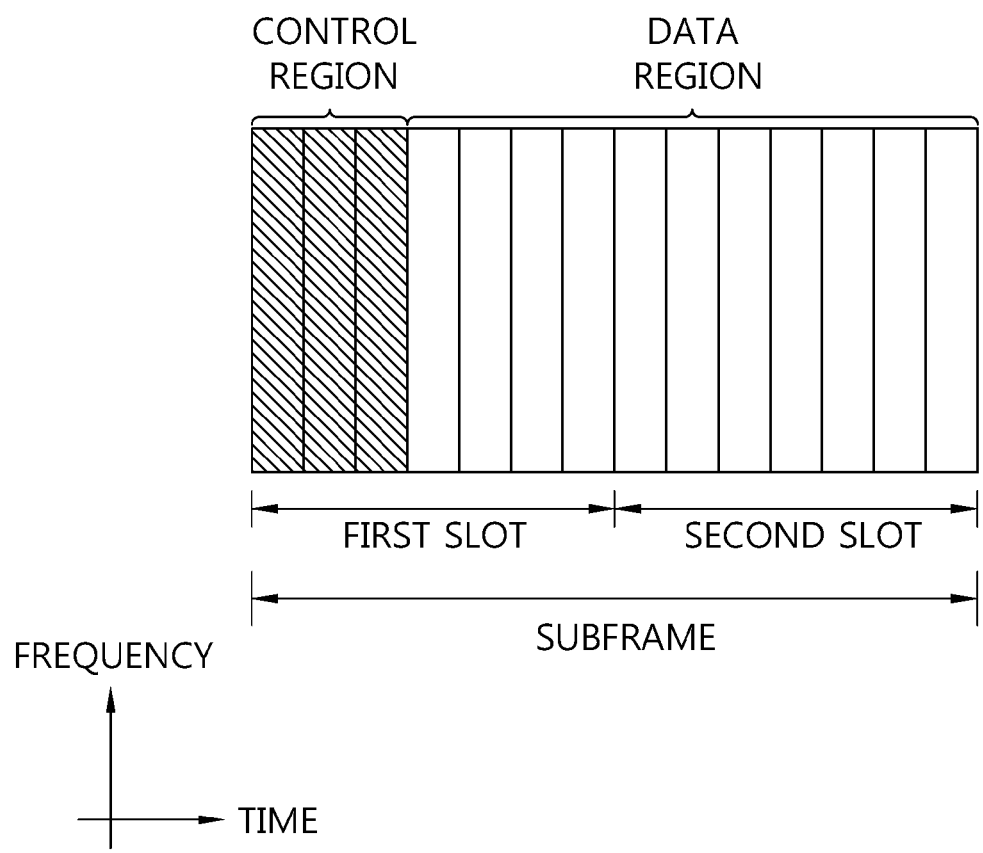

[Fig. 5]
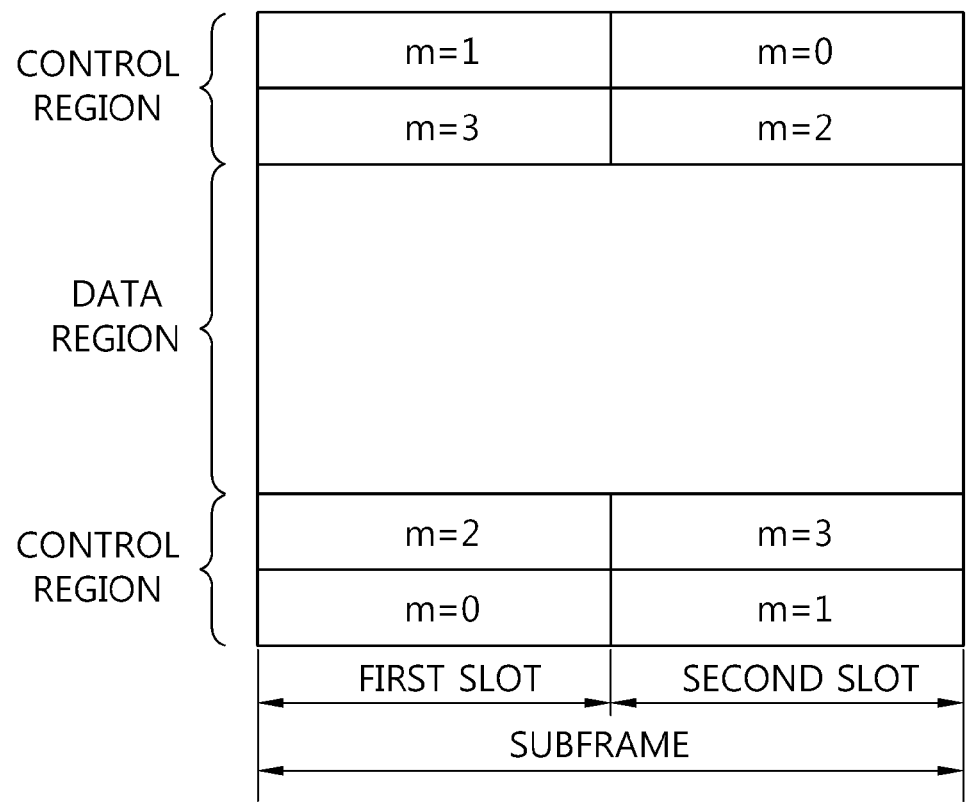

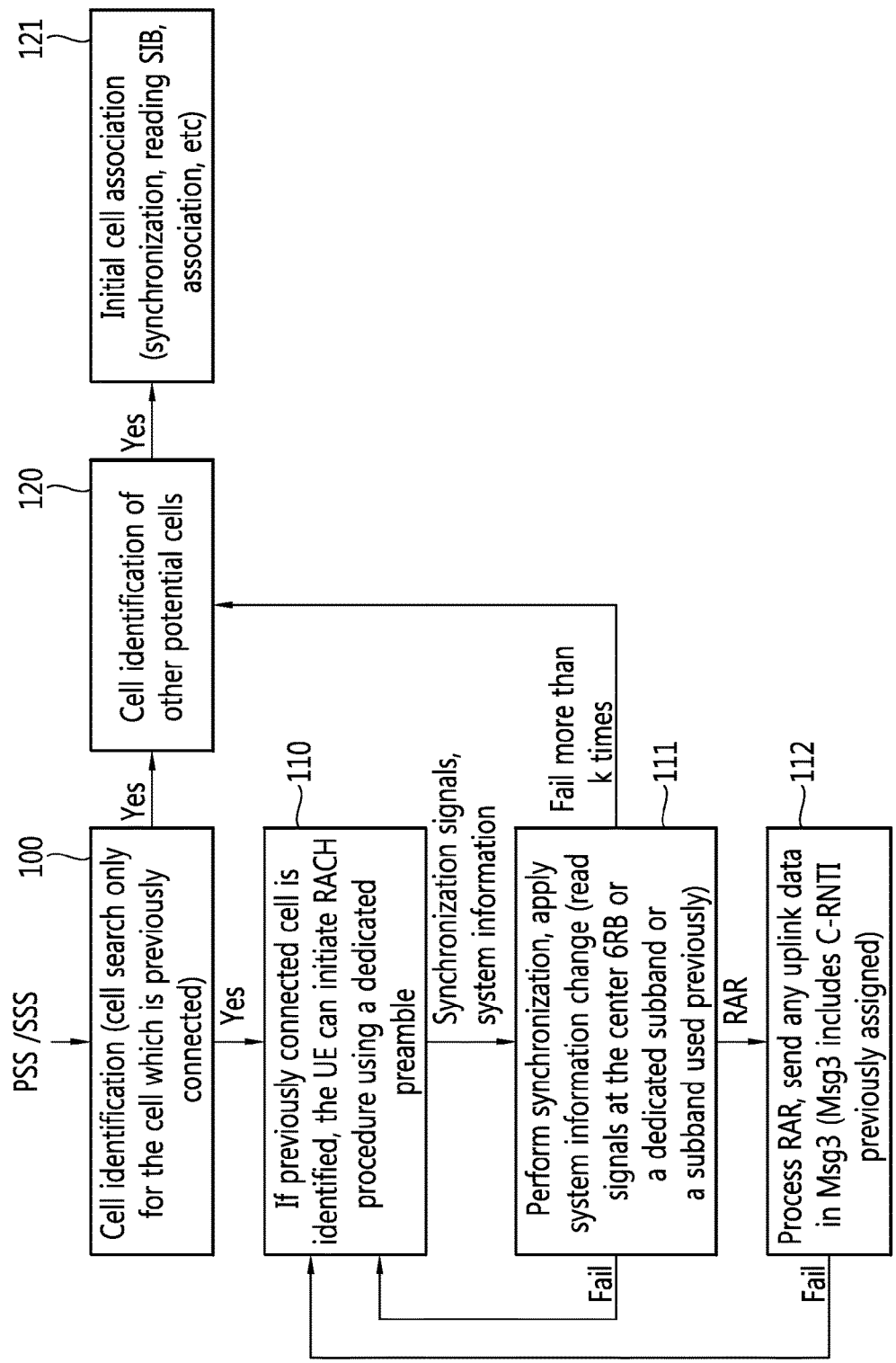
[Fig. 6]

[Fig. 7]
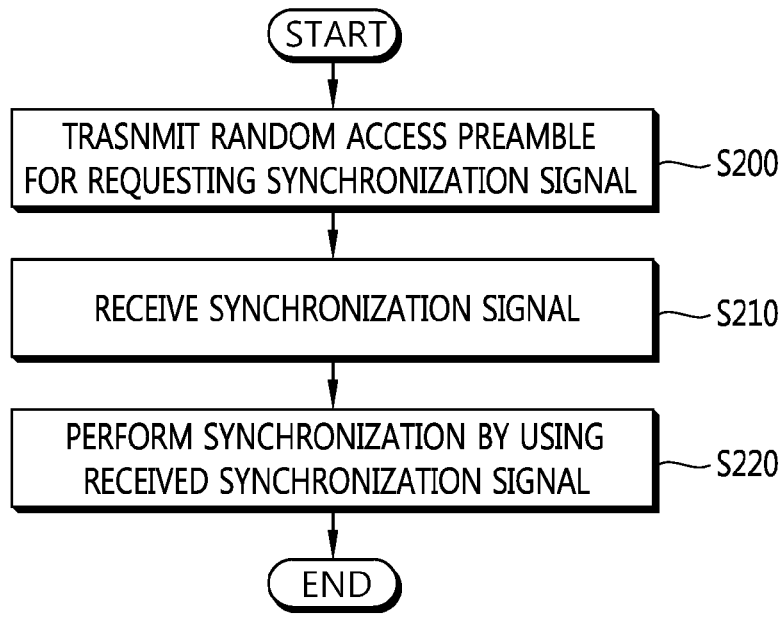
[Fig. 8]
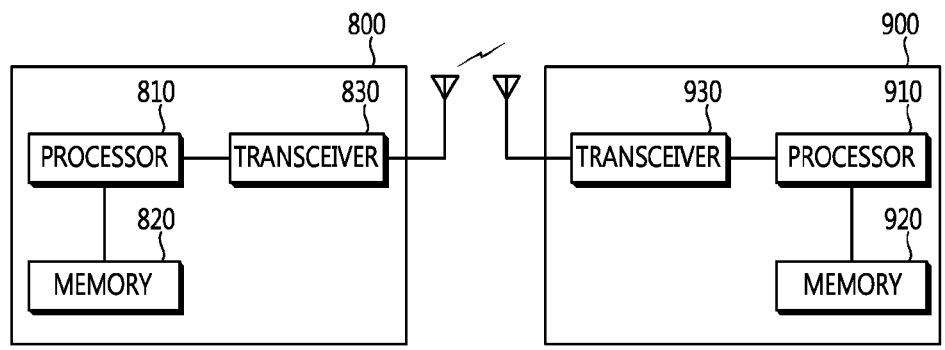

METHOD AND APPARATUS FOR REQUESTING TRANSMISSION OF SYNCHRONIZATION SIGNALS IN WIRELESS COMMUNICATION SYSTEM

CROSS-REFERENCE TO RELATED APPLICATIONS

This application is the National Stage filing under 35 U.S.C. 371 of International Application No. PCT/KR2015/009890, filed on Sep. 21, 2015, which claims the benefit of U.S. Provisional Application No. 62/053,212 filed on Sep. 21, 2014, the contents of which are all hereby incorporated by reference herein in their entirety.

BACKGROUND OF THE INVENTION

Field of the Invention

The present invention relates to wireless communications, and more particularly, to a method and apparatus for requesting transmission of synchronization signals in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

In the future versions of the LTE-A, it has been considered to configure low-cost/low-end (or, low-complexity) user equipments (UEs) focusing on the data communication, such as meter reading, water level measurement, use of security camera, vending machine inventory report, etc. For convenience, these UEs may be called machine type communication (MTC) UEs. Since MTC UEs have small amount of transmission data and have occasional uplink data transmission/downlink data reception, it is efficient to reduce the cost and battery consumption of the UE according to a low data rate.

It is expected that machine type communication (MTC) UEs are installed rather coverage-limited area such as basement. To enhance the coverage enhancement while reducing the cost of MTC UEs, it may be assumed that the network handles both normal UEs (category 1-9 UE without any additions for coverage enhancement techniques and low cost UEs (category 0 UE or new category UE without any additions for coverage enhancement techniques)), and coverage limiting UEs which are operated with coverage enhancement techniques applied. To avoid the unnecessary spectral efficiency degradation to handle coverage-limiting UEs, it is essential to best estimate the required coverage enhancement. Also, handling this new type of UEs should not jeopardize the legacy UEs which are not aware of the existence of coverage limiting UEs.

A method for reducing power for MTC UEs may be required.

SUMMARY OF THE INVENTION

The present invention provides a method and apparatus for requesting transmission of synchronization signals in a wireless communication system. The present invention provides potential mechanisms for power reduction to minimize power consumption of a low cost user equipment (UE). The present invention provides UE-initiated request on transmission of synchronization signals for power reduction.

In an aspect, a method for requesting, by a machine type communication user equipment (MTC UE), a synchronization signal in a wireless communication system is provided. The method includes transmitting a random access preamble for requesting the synchronization signal to a network, receiving the synchronization signal from the network, and performing synchronization by using the received synchronization signal.

In another aspect, a machine type communication user equipment (MTC UE) includes a memory, a transceiver, and a processor coupled to the memory and the transceiver, and configured to control the transceiver to transmit a random access preamble for requesting the synchronization signal to a network, control the transceiver to receive the synchronization signal from the network, and perform synchronization by using the received synchronization signal.

Battery life of a low cost UE can be maximized.

BRIEF DESCRIPTION OF THE DRAWINGS

FIG. 1 shows a wireless communication system.
FIG. 2 shows structure of a radio frame of 3GPP LTE.
FIG. 3 shows a resource grid for one downlink slot.
FIG. 4 shows structure of a downlink subframe.
FIG. 5 shows structure of an uplink subframe.
FIG. 6 shows an example of a state diagram according to an embodiment of the present invention.
FIG. 7 shows an example of a method for requesting a synchronization signal according to an embodiment of the present invention.
FIG. 8 shows a wireless communication system to implement an embodiment of the present invention.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

Machine type communication (MTC) UEs may be used mainly in environments where the human may not easily approach (and thus, power line may not be available). Or, MTC UEs should not require so much maintenance. Accordingly, the efficient power usage is essential. For an efficient power usage, the following principles may be considered.

Connection-less operation: This is required to minimize the overhead of connection maintenance such as measurements, time/frequency synchronization, etc.

Event-triggered wake-up: Instead of triggering the wake-up by a pre-configured/determined or higher-layer configured pattern, a MTC UE may wake up only if there is an event. Even for discontinuous reception (DRX), instead that the network configures DRX cycle, a MTC UE may perform DRX if there is no data and wake up at a pre-determined pattern. Once the MTC UE wakes up, the MTC UE may transmit an initiation message to the network (such as polling message) so that the network can transmit any pending data or initiate any transmission to the MTC UE.

Minimize the communication time or ActiveTime: Once the MTC UE wakes up, it is necessary to minimize ActiveTime by transmitting/receiving necessary data transaction as quickly as possible. Since the MTC UE even in waiting mode or monitoring DL data may consume energy, from the power saving perspective, it is essential to minimize overall communication time. Also, frequency sleep/wake-up may not save the power of the MTC UE considerably. Thus, a short time to finish a transaction seems essential for an efficient power scheme.

Hereinafter, potential mechanisms for power reduction to minimize power consumption of a machine type communication (MTC) UE according to an embodiment of the present invention are described. According to an embodiment of the present invention, the specification impacts based on potential procedure of UE cell association may be discussed. In the description below, a MTC UE is used representatively, but the MTC UE may be replaced with other terminologies such as a low cost UE, a low end UE, a low complexity UE, a narrow(er) band UE, a small(er) band UE, and a new category UE.

Initial cell (re-)association at boot-up or at wake-up according to an embodiment of the present invention is described. When a MTC UE is boot-up, without knowing whether the network supports a MTC UE or not, the first step is to perform cell search. Through a cell search process, the MTC UE may need to identify at least one of followings (1) Whether the network supports a MTC UE: To determine the capability of the network, a MTC UE may search a specific signal (such as primary synchronization signal (PSS)/secondary synchronization signal (SSS) scrambled with a specific sequence for supporting a MTC UE) or read a physical broadcast channel (PBCH) (or PBCH-like new broadcast channel) or read a SIB (or SIB-like new broadcast channel) which indicates whether the network supports a MTC UE. Furthermore, if the MTC UE needs coverage enhancement, whether the network supports coverage enhancement or not may be further identified (via similar mechanism to determine the serviceability on supporting a MTC UE). To minimize the power consumption, indication of whether the network supports the MTC UE and/or coverage enhancement may be a separate signal or may be conveyed over PBCH. Another approach is to detect a cell supporting a MTC UE with coverage enhancement via detecting a synchronization signal over a narrowband (such as 200 kHz). If such a cell is detected, it may be assumed that it may support a MTC UE with coverage enhancements. It is still considerable though that the maximum coverage level that the network is going to support may be indicated by PBCH such that a UE requiring more coverage enhancements than the network supports may assume that the cell is barred due to the lower coverage level support.

(2) Cell ID identification (3) Time/frequency synchronization

After wake-up and reading necessary cell identification signals, if the MTC UE detects a cell which is already known to the MTC UE (from the past cell acquisition process), by reading PSS/SSS, the MTC UE may transmit physical random access channel (PRACH) based on PRACH configuration information received previously. This means that the MTC UE may not perfectly synchronize itself to the network, as it may need some latency. By transmitting PRACH, the MTC UE may request to the network to transmit necessary synchronization signals. For this, a set of preamble may be reserved to be used by the MTC UE, which has not been fully synchronized, such that the MTC UE waits further synchronization signal transmission. Upon receiving those preamble, the network may transmit dedicated synchronization signals, which allows one-shot time/frequency synchronization, and/or necessary system information and/or necessary RRC information for the MTC UE.

In other words, by utilizing, such as FDMA, with large gap which may not require tight UL synchronization, a MTC UE may transmit a polling signal to the network once it wakes up. When the network receives the signal, the network may transmit synchronization signals. The timing when those polling signals can be transmitted may be rather prefixed (or assumed not to be changed while a UE is in idle mode). As one example of allowing a larger gap to compensate a loose frequency tracking, it may be assumed that 1/K subcarriers are used where K-1 subcarriers are used for gaps to handle frequency error. For example, if 3 kHz subcarrier spacing is used in 200 kHz, which results 60 subcarriers in 180 kHz, only 20 subcarriers may be used for polling message. For example, if the subcarrier index is 0 to 59, subcarrier 1, 4, 7, ... may be used for a polling message transmission. It may be assumed that the set of subcarriers used for polling message is prefixed or configured via MIB and/or SIB. In terms of timing advance, it is also assumed that timing advance may not be used. Also, the time location where the polling message can be transmitted may be either prefixed or indicated via cell broadcast message(s).

Thus, the MTC UE may need to process those synchronization signals and system information before it is able to read random access response (RAR), and accordingly, the latency to expect RAR may be further relaxed. For example, the necessary synchronization signals may be transmitted no rather than 6 ms once those preambles are received. After then, RAR may be transmitted no later than 4 ms (after the synchronization signals). Actual latency may be further relaxed or reduced depending on hardware capability of the MTC UE. RAR message, if needed, may include system information. Since the network may not know C-RNTI of the MTC UE, the MTC UE may transmit its C-RNTI via message 3 or the network may assign a new C-RNTI via RACH procedure (as before). After receiving the message 3, and the network may identify the MTC UE, and then, the network may configure necessary RRC parameters such as the subband index where the MTC UE expects to receive the subsequent data/control signal transmission. Upon wake-up, it may be assumed that RAR, synchronization signals, necessary system information is forwarded in a subband which is either a default subband (e.g. the center 6 PRBs) or a subband previously used.

FIG. 6 shows an example of a state diagram according to an embodiment of the present invention. Upon reading PSS/SSS, in state 100, cell identification is performed. Only the cell which is previously connected may be searched. In state 110, if previously connected cell is identified, the MTC UE initiates RACH procedure by using a dedicated preamble used for requesting synchronization signals. Upon receiving synchronization signals and/or system information, in state 111, the MTC UE performs synchronization and/or applies system information change. The MTC UE may read s synchronization signals and/or system information at the center 6 PRBs for the MTC UE or a dedicated subband or a subband used previously. In state 112, the MTC UE receives RAR and transmit any UL data in message 3. Message 3 may include C-RNTI previously assigned. If previously connected cell is not identified, in state 120, cell identification of other potential cells may be performed. In state 121, initial cell association, such as synchronization, reading SIB, association, etc., may be performed.

One example of synchronization signals is multiple sets of PSS/SSS or multiple sets of PSS or SSS. System information, if transmitted, may include only changed parameters if the network knows for sure which system information that the MTC UE may have. Otherwise, the total system information may be transmitted again, assuming that the MTC UE may be out-of-connection to the network more than a threshold (a threshold may be 30 seconds which is assumed to be the time of validity of SIB). For the MTC UE, a different threshold may be considered (e.g. longer validity time to minimize the system information update). The MTC UE may not be required to receive SIB update indication via paging. Upon wake-up, if needed, the MTC UE may request transmission of SIB. Considering a long OFF cycle of the MTC UE, the network may be expected not to update SIB so frequently.

More specifically, if the MTC UE considers itself as a static UE, and thus, unless the network fails, the previously serving cell may be valid upon wake-up. In this case, the MTC UE may initiate PRACH without even identifying the cell based on PSS/SSS. In other words, the MTC UE, using one of dedicated preambles, may transmit PRACH to the network so that the network can transmit the necessary synchronization signals and/or necessary system information.

Dedicated preambles may be configured via either PBCH or SIB or may be configured by higher layer to each MTC UE. Dedicated preambles used by the MTC UE may be assumed not to be used by a legacy UE regardless of contention or non-contention based RACH procedure. It may be also considered that a different sequence or preamble format is used for a MTC UE (different from a legacy preamble).

Once the MTC UE wakes up, the overall procedure may be as follows.

Transmit PRACH for requesting synchronization signals
Wait for synchronization signals (6 ms) and perform synchronization
Wait for RAR (4 ms) which includes UL grant and/or DL scheduling information
If RAR includes any DCI for PDSCH, read PDSCH
Transmit UL transmission (about 2-4 ms) based on UL grant
Transmit ACK-NACK either along with UL transmission or separately (2-4 ms)
Transmit multiple UL transmissions up to the latency of ACK/NACK from the network (e.g. 3 times)
Wait for ACK-NACK from the network (4 ms)
Complete the transaction and go to sleep, even though the NACK is received, since retransmission (e.g. 3 times) already occurred. Alternatively, the MTC UE may not perform retransmission while it is waiting for ACK-NACK, in this case, retransmission may be performed upon receiving NACK.

It may be assumed that the network may know the size of UL transmission before. If there are still pending data to be transmitted, when transmitting PUSCH, a flag (e.g. more data) may be triggered within a PUSCH, so that the network can schedule another DCI. In this case, the network may not transmit ACK-NACK, rather it schedules DCI with new data indication which is assumed as ACK.

Based on the procedure described above according to an embodiment of the present invention, the overall latency to handle one transaction may be around 22 ms. Based on the synchronization, the MTC UE can perform necessary synchronization and measurements.

When RAR includes also DL scheduling, it may be expected that actual PDSCH transmission scheduled by DCI within RAR will be transmitted later subframe (e.g. at the next subframe where RAR is received). This is to allow the MTC UE processing time on PDSCH of RAR and then read DCI contained in PDSCH of RAR. The timing of that PDSCH scheduled by RAR may be K (e.g. K=1), which is predetermined.

When the MTC UE performs autonomous retransmission, redundancy version (RV) may change as same as retransmission. Similar to TTI bundling, this may be configured to be enabled. If not enabled, the MTC UE may not perform autonomous retransmission. When autonomous retransmission is enabled (similar to TTI bundling), the MTC UE may not need to wait for explicit ACK-NACK from the network. Once it finishes its required (re)transmission, the MTC UE may go back to sleep.

Similar to UL transmission, if there are more data to be received, a flag (e.g. more data) may be inserted to the PDSCH scheduled by RAR. If flag is triggered, the MTC UE may monitor a DL subframe for further transmission at n+k subframe, where n subframe is the subframe where PDSCH scheduled by RAR is received. For example, k=8 if the current HARQ-ACK timing is used. In other words, the MTC UE may not be required to monitor every subframe. The subframe where the MTC UE should monitor may be determined by previous transmission. If PDSCH reception scheduled by RAR fails, the MTC UE may transmit NACK and wait for retransmission at a given subframe. Retransmission or a new data (successive data transmission) may occur at a given subframe. For example, the MTC UE may expect any DL retransmission at n+k subframe, where n is the subframe of the previous transmission (e.g. k=8). This may reduce the flexibility of the network, yet, may minimize the necessary of UE monitoring or restrict UE monitoring to a few subframes. Alternatively, the MTC UE may be (pre-) configured with a set of subframes where the MTC UE needs to monitor potential DL transmissions. (Re)transmission may occur only on those subframes including RAR.

When more than one PDSCH or PUSCH transmission is necessary, it may be desirable from the power saving perspective to allow parallel transmission as much as possible. Thus, the number of parallel transmission or the number of HARQ processes may be different based on the application and the characteristics of the MTC UE. Thus, a UE capability may be informed to the network.

FIG. 7 shows an example of a method for requesting a synchronization signal according to an embodiment of the present invention. The MTC UE may perform a cell search for identifying whether the network supports the MTC UE or coverage enhancement, or for identifying a cell ID, before transmitting a random access preamble.

In step S200, the MTC UE transmits a random access preamble for requesting the synchronization signal to a network. The random access preamble may be a dedicated random access preamble, which may be configured via a PBCH, a SIB, or a higher layer signaling.

In step S210, the MTC UE receives the synchronization signal from the network. The MTC UE may further receive system information together with the synchronization signal from the network. The MTC UE may further apply the received system information. The system information may include only changed system information. The synchronization signal may consist of at least one of a PSS or a SSS. The synchronization signal may be received via 6 PRBs at center of a system bandwidth or a dedicated subband or a subband used previously.

In step S220, the MTC UE may perform synchronization by using the received synchronization signal. After performing the synchronization, the MTC UE may receive a random access response from the network as a response to the random access preamble. After receiving the random access response, the MTC UE may transmit a message including UL data to the network. The message may include a C-RNTI which is previously assigned.

FIG. 8 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A MTC UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for performing synchronization in a wireless communication system, the method performed by a machine type communication user equipment (MTC UE) and comprising:
    determining whether the MTC UE wakes up;
    transmitting, to a network, a random access preamble requesting synchronization information when determining that the MTC UE wakes up;
    receiving, from the network, the synchronization information together with system information in response to the random access preamble; and
    performing the synchronization by using the received synchronization information and the system information,
    wherein when the MTC UE is out-of-connection with the network for more than a specific threshold, the system information includes total system information, and
    when the MTC UE is not out-of-connection with the network for more than the specific threshold, the system information includes only changes to the total system information.

2. The method of claim 1, wherein the random access preamble is a dedicated random access preamble.

3. The method of claim 2, wherein the dedicated random access preamble is configured via a physical broadcast channel (PBCH), a system information block (SIB), or higher layer signaling.

4. The method of claim 1, wherein the synchronization information consists of at least one of a primary synchronization signal (PSS) or a secondary synchronization signal (SSS).

5. The method of claim 1, wherein the synchronization information is received via 6 physical resource blocks (PRBs) at a center of a system bandwidth, in a dedicated subband or a previously used subband.

6. The method of claim 1, further comprising:
    performing a cell search, before transmitting the random access preamble.

7. The method of claim 6, wherein performing the cell search comprises identifying whether the network supports the MTC UE or coverage enhancement.

8. The method of claim 6, wherein performing the cell search comprises identifying a cell identifier (ID).

9. The method of claim 1, further comprising:
    receiving a random access response from the network as a response to the random access preamble, after performing the synchronization.

10. The method of claim 9, further comprising:
    transmitting a message including uplink (UL) data to the network, after receiving the random access response.

11. The method of claim 10, wherein the message includes a cell radio network temporary identifier (C-RNTI).

12. A machine type communication user equipment (MTC UE) comprising:
    a memory;
    a transceiver; and
    a processor coupled to the memory and the transceiver, said processor configured to:
    determine whether the MTC UE wakes up;
    control the transceiver to transmit, to a network, a random access preamble requesting synchronization information when determining that the MTC UE wakes up;
    control the transceiver to receive, from the network, the synchronization information together with system information in response to the random access preamble; and
    performs synchronization by using the received synchronization information and the system information,
    wherein when the MTC UE is out-of-connection with the network for more than a specific threshold, the system information includes total system information, and
    when the MTC UE is not out-of-connection with the network for more than the specific threshold, the system information includes only changes to the total system information.

* * * * *